May 27, 1941.  L. DE FIORE  2,243,197
BURR REMOVER
Filed May 7, 1938  4 Sheets-Sheet 1
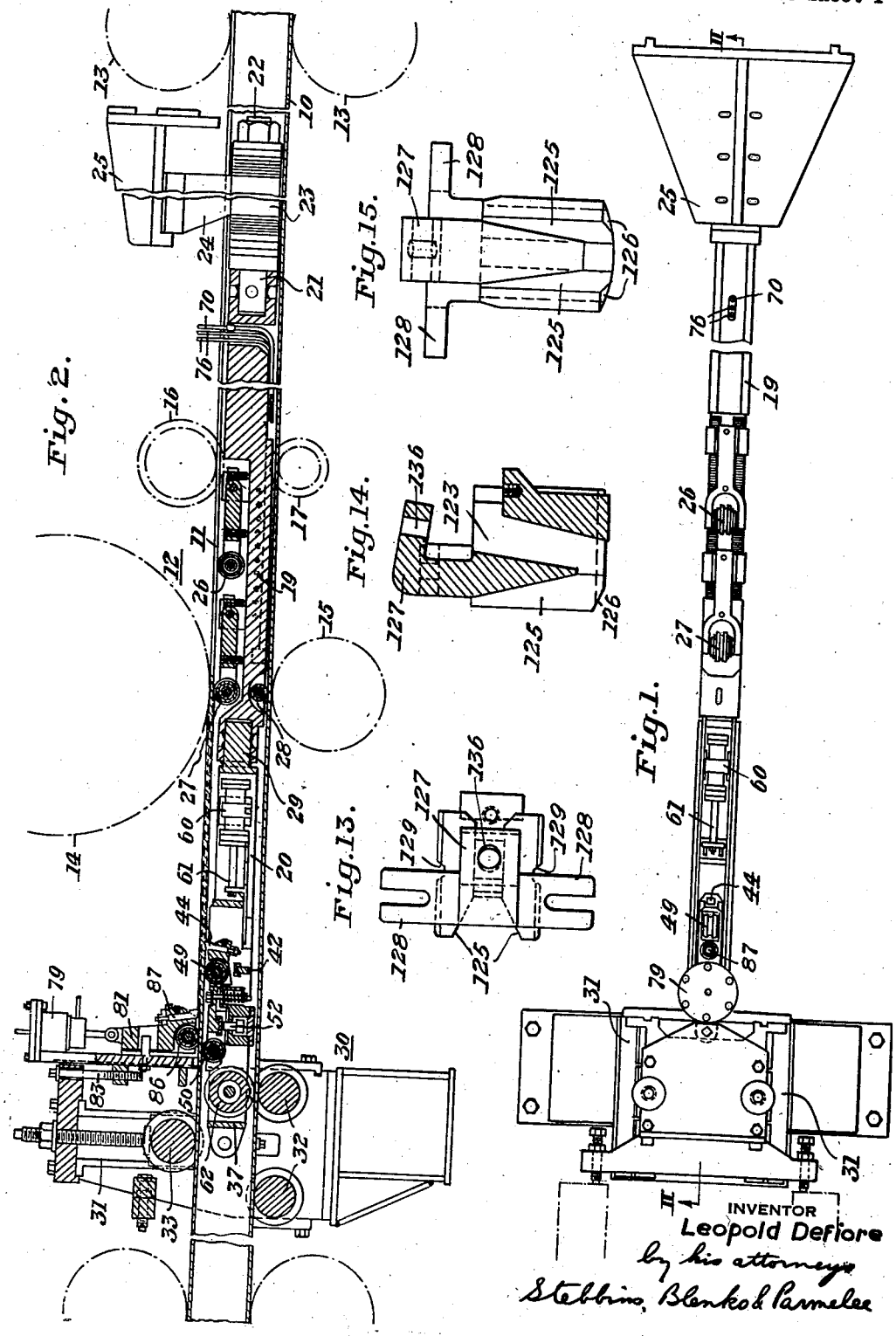
INVENTOR
Leopold Defiore
by his attorneys
Stebbins, Blenko & Parmelee

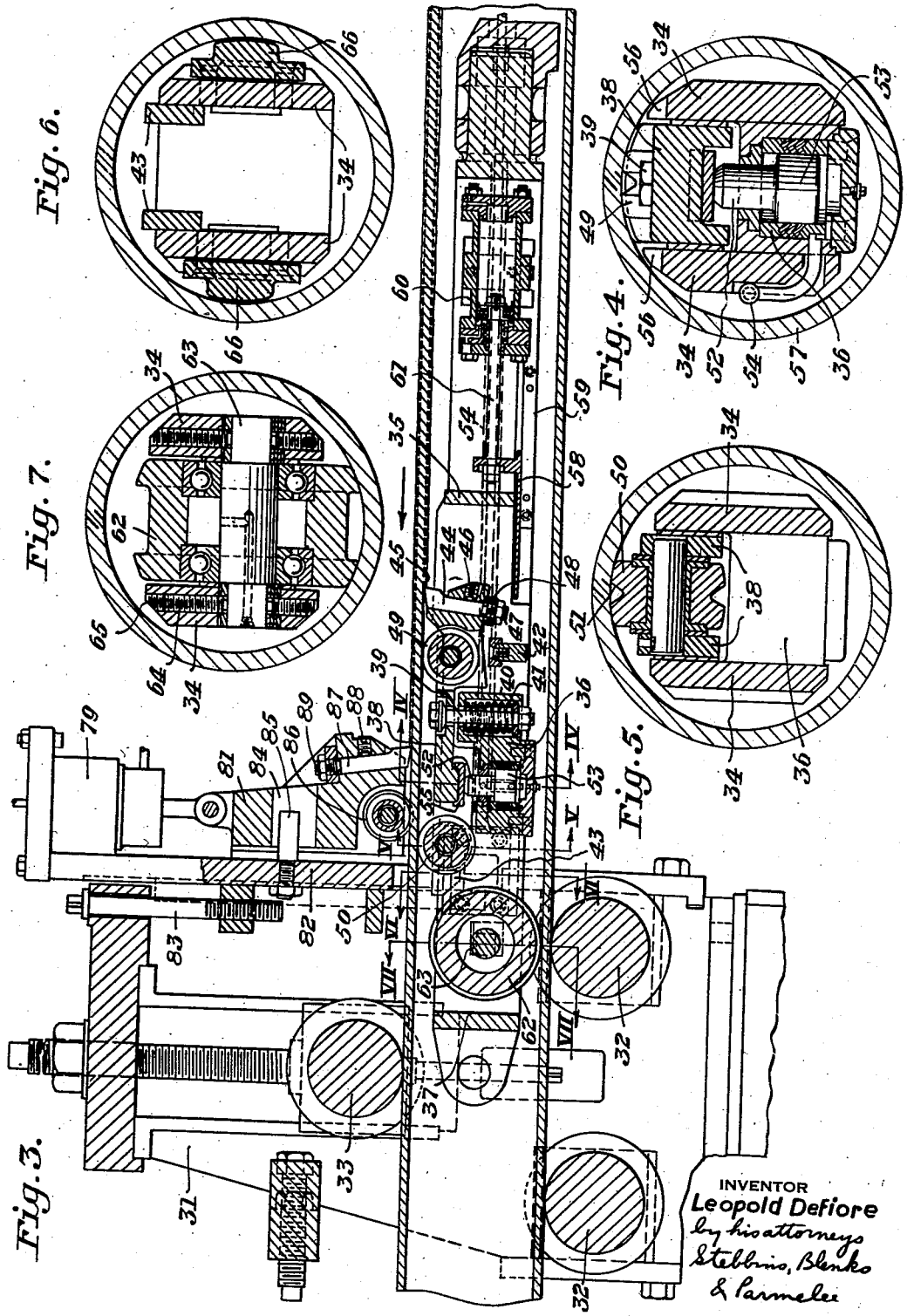

May 27, 1941.  L. DE FIORE  2,243,197
BURR REMOVER
Filed May 7, 1938   4 Sheets-Sheet 3

INVENTOR
Leopold Defiore
by his attorneys
Stebbins, Blenko & Parmelee

May 27, 1941.  L. DE FIORE  2,243,197
BURR REMOVER
Filed May 7, 1938  4 Sheets-Sheet 4

INVENTOR
Leopold Defiore
by his attorneys
Stebbins, Blenko & Parmelee

Patented May 27, 1941

2,243,197

UNITED STATES PATENT OFFICE 2,243,197

BURR REMOVER

Leopold De Fiore, Youngstown, Ohio, assignor to The Youngstown Sheet & Tube Company, a corporation of Ohio Application May 7, 1938, Serial No. 206,593

14 Claims. (Cl. 90—24)

This invention relates to an apparatus for removing the burr from a welded seam and, in particular, to apparatus adapted for use in connection with electric pipe welding apparatus of various types, several of which are now well-known.

In the manufacture of electric welded pipe as ordinarily carried on, it is desirable to remove the burr from the welded seam shortly after the completion of the weld while the material composing the burr is still hot and readily removable. This necessitates that the mechanism for removing the inside burr be so designed as to be enclosed within the pipe as the latter emerges from the welding apparatus and that it be secured to the mandrel ordinarily supported within the pipe as it is welded by means extending radially through the longitudinal seam cleft in the cylindrical blank from which the pipe is welded.

In order to remove the interior burr uniformly and provide a good finish on the inside of the welded seam, it is necessary that the burr removing means be positioned accurately relative to the pipe wall and positively maintained in proper position. It is also important that the burr removed be not merely diverted from the seam to another part of the interior of the pipe but that it be confined as it collects for subsequent disposal.

I have invented a burr removing apparatus which satisfactorily accomplishes the aforementioned objectives and is characterized by numerous additional novel features and advantages over means known heretofore for effecting burr removal. The shortcomings of the latter are well-known in the art as the matter of removing the interior burr has been as troublesome as any other one step in the manufacture of welding pipe if not more troublesome. The space limitation in the first place has precluded the use of anything but the simplest form of tools and mechanism for effecting burr removal and for lack of something better, the art has long put up with more or less make-shift devices.

In its preferred form, my invention comprises a mandrel adapted to be anchored to the mandrel cooperating with the welding apparatus and to be enclosed by a pipe length moving axially out of the welder. A supporting roll at the rear end of the mandrel cooperates with a stand of guide rolls through which the welded pipe passes. A tool supporting carriage is movably mounted on the mandrel and is provided at its head end with a cutting tool effective to remove the burr from the welded seam. The carriage is provided with means in the form of rolls adapted to engage the pipe wall and properly position the carriage and the tool mounted thereon. I provide means tending to retract the carriage and its tool into inoperative position. Power means are also included for advancing the carriage and tool into burr removing position after the leading end of a pipe length emerging from the welder has passed beyond the tool.

The burr removed from the seam is discharged into a receiving chamber provided by spaced side wall portions of the mandrel, a cross wall extending therebetween and a movable bottom. Power means are provided operating the latter during the interval between the welding of successive pipe lengths.

The foregoing and other novel features of the invention will be described in greater detail hereinbelow with reference to the accompanying drawings illustrating a preferred embodiment. In the drawings:

Fig. 1 is a plan view of a mandrel adapted to be enclosed by successive pipe lengths as they pass through a welding apparatus (not shown);

Fig. 2 is a sectional view taken along the line II—II of Fig. 1 showing a pipe length traversing the mandrel;

Fig. 3 is a partial sectional view similar to Fig. 2 showing particularly the inside burr trimmer and the mandrel on which it is mounted;

Figs. 4 through 7 are sectional views taken along the lines IV—IV, V—V, VI—VI and VII—VII of Fig. 3;

Fig. 13 is a plan view of a tool holder block incorporated in the burr trimmer of Figs. 11 and 12;

Fig. 14 is a sectional view along the line XIV—XIV of Fig. 13; and

Fig. 15 is a front elevation of the block.

Figure 8:
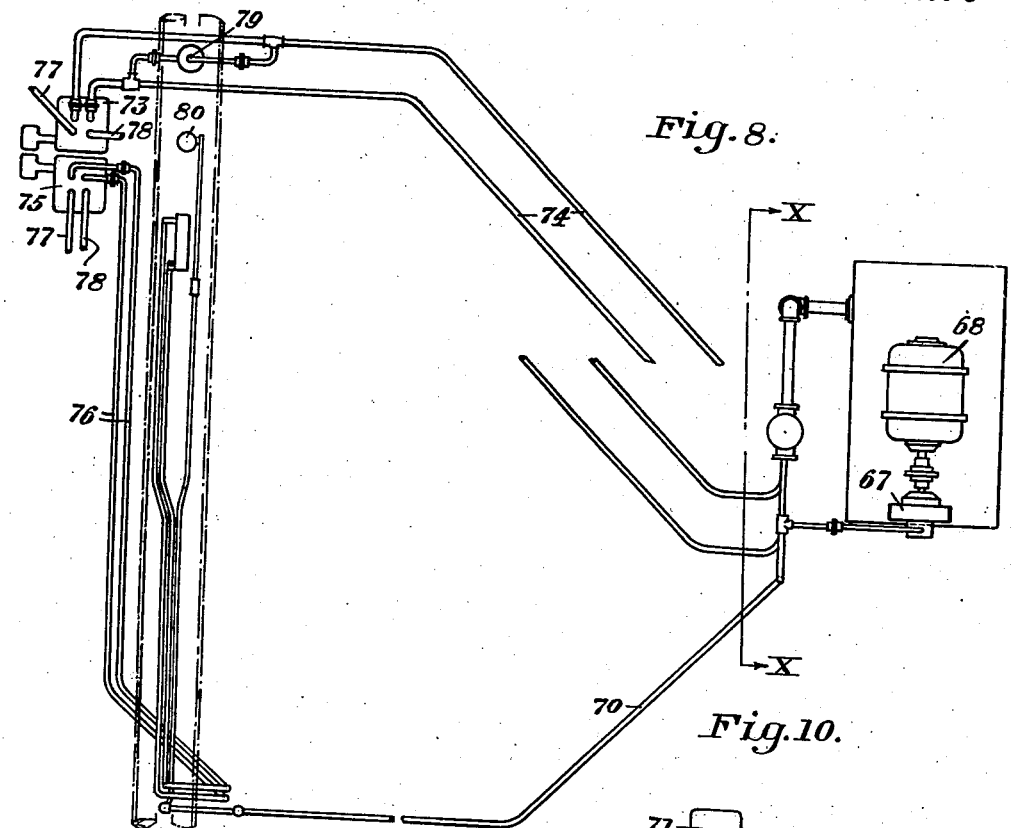
Fig. 8 is a plan view showing the piping system employed to control the various power operated devices forming part of the invention.

Referring now in detail to the drawings and for the present, to Figs. 1 and 2, a pipe blank 10 of cylindrical form having a longitudinal seam cleft 11 is fed axially toward apparatus for progressively welding the edges of the seam cleft together, indicated generally at 12, by a stand of feeding in rolls indicated diagrammatically at 13. The welding apparatus may be of any desired type but in the drawings I have illustrated diagrammatically an annular rotary electrode 14 cooperating with a bottom supporting roll 15 adapted to effect the welding of the edges of the seam cleft by the progressive electric resistance method. Guide rolls 16 and 17 cooperate with the rolls 13 in directing the blank into the welding throat defined by the electrode 14 and bottom support roll 15.

As the blank is fed forward toward the welding apparatus it encloses a mandrel indicated generally at 18 having a portion 19 cooperating with the welding apparatus, which will hereafter be referred to as the welder mandrel, and a portion 20 cooperating with the burr trimming apparatus to be described in detail later, which will hereafter be referred to as the burr trimmer mandrel. The welder mandrel 19 is secured by a pin and box connection 21 to a stud 22 extending through a sleeve 23. The sleeve is formed integral with a plate 24 extending downwardly through the seam cleft and secured to a bracket 25 which may conveniently be bolted to the housings in which the rolls 13 are mounted. The present invention is not concerned with the details of the welder mandrel and it will be sufficient, therefore, to state only that it is provided with an adjustable roll 26 adapted to engage the edges of the seam cleft just prior to the entry into the welding throat, a similar adjustable roll 27 and a roll 28 located adjacent the transverse plane containing the axes of the electrode 14 and bottom support roll 15.

The burr trimmer mandrel 20 is secured to the welder mandrel 19 by a pin and box connection 29 and cooperates with a stand of guide rolls 30 including housings 31 with bottom guide rolls 32 and an adjustable top roll 33 journaled therein.

Referring now more particularly to Figs. 3 through 7 illustrating the burr trimmer mandrel 20 and parts associated therewith in greater detail, it will be observed that the mandrel 20 comprises an elongated structure having spaced side walls 34 extending throughout the greater portion of its length, connected at intermediate points by portions 35, 36 and 37. A tool holder carriage 38 is movably disposed between the spaced side walls 34 of the mandrel above the connecting portion 36 thereof. The carriage 38 is slidable vertically and is normally held in retracted position by a spring-urged bolt 39 extending therethrough. The bolt 39 also extends through an inverted cup 40 formed integral with the connecting portion 36. A compression spring 41 bearing against the end wall of the cup and a washer on the bolt effects the retracting force on carriage 38. In its retracted position, the carriage engages a transverse stop 42 extending between the side walls 34. Lugs 43 secured to the side walls 34 limit movement of the carriage 38 longitudinally of the mandrel.

The carriage adjacent its forward end is provided with a socket adapted to receive the shank of a tool indicated at 44. This tool is effective when the carriage is in the position illustrated, to cut the burr indicated at 45 from the welded seam formed between the abutting edges of the seam cleft of the blank 18 on passage through the welding apparatus. The tool 44 is held in position by a headless slotted set screw 46. Longitudinal adjustment of the tool is effected by a slotted stud 47 threaded through a tapped lug 48 welded to the carriage in alinement with the tool socket.

Guide rolls 49 and 50 are disposed in recesses formed in the carriage 38 and are journaled on shafts extending thereacross. The rolls are grooved as at 51 to straddle the hot welded seam and serve when in engagement with the inner wall of the pipe, to position the tool 44 accurately relative thereto.

The carriage 38 is held in the position shown in Fig. 3 against the force of the spring 41 tending to retract it toward the axis of the mandrel, by a thruster 52. The thruster 52 is carried on a piston 53 mounted in a cylinder bored in the connecting portion 36 of the mandrel. Fluid under pressure is delivered to the cylinder through a connection 54 extending alongside the mandrel, under the control of suitable means to be described shortly. It will be apparent, however, from the foregoing description that admission of fluid under pressure to the cylinder in the connecting portion 36 causes the piston 53 and thruster 52 to rise, forcing the carriage upwardly to the illustrated position against the force of the spring 41. It will be noted that the thruster engages a bearing plate 55 secured to the carriage at a point behind the bolt 39 which, as already explained, normally exerts a downward force on the carriage at the point at which it passes therethrough. By virtue of this relation of parts, elevation of the piston 53 will cause the rear roller 50 to rise first into engagement with the pipe wall and then force the foremost roll 49 and the tool 44 into engagement with the pipe wall and burr respectively. This mode of operation prevents the tool 44 from digging into the burr to an excessive depth as might occur if the force tending to elevate the carriage were applied ahead of the bolt 39.

The side walls 34 extend upwardly above their normal height adjacent the tool 44 as indicated at 56. The upward edges of the side walls have only a slight clearance with respect to the pipe passing over the mandrel indicated at 57. The side walls 34 and the web or cross wall 35 extending therebetween provide a confined space for receiving burr removed from the pipe by the tool 44. A support for the bottom of this space is provided in the shape of a pan or shelf 58 slidable along guides 59 secured to the side walls 34. As shown in Fig. 3, the pan 58 is normally in position to receive burr deposited thereon. I also provide means for retracting the pan between the passage of successive pipe lengths over the mandrel 20, whereupon the accumulations of burr are removed or dumped by the transverse wall 35.

A cylinder 60 is mounted between the side walls 34 adjacent the head end of the mandrel 20, by any convenient means. A piston reciprocable in the cylinder has a piston rod 61 secured to the pan 58. Suitable connections to be described later permit the application of fluid under pressure to opposite ends of the cylinder 60 whereby to operate the pan 58 in the manner aforesaid.

A supporting roll 62 is journaled on a shaft 63 extending between the side walls 34 adjacent the rear end of the mandrel. The shaft 63 may be adjusted vertically by screws 64 threaded through tapped holes 65 in the side walls and bearing on the ends of the shaft. While a pipe is traversing the mandrel the roll 62 rides on the inside of the pipe. In the interval between the passage of successive pipe lengths over the mandrel the roll 62 engages the forward roll 32 of the two bottom guiding rolls. Just ahead of the roll 62, shoes 66 are secured to the side walls 34 to position the mandrel laterally relative to the pipe.

Figure 10:
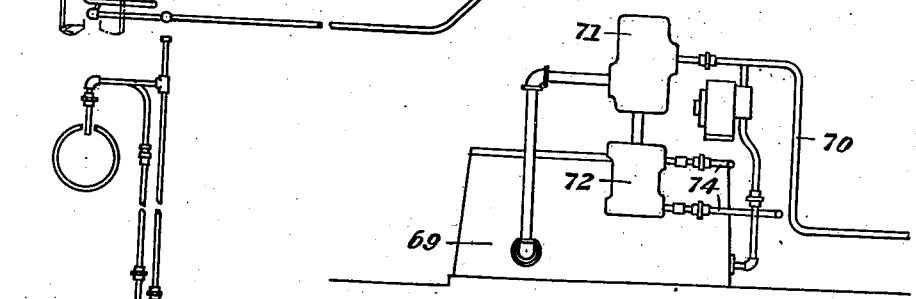
Fig. 10 is a side elevation of a portion of the control apparatus such as would be seen from the line X—X of Fig. 8.
Figure 9:
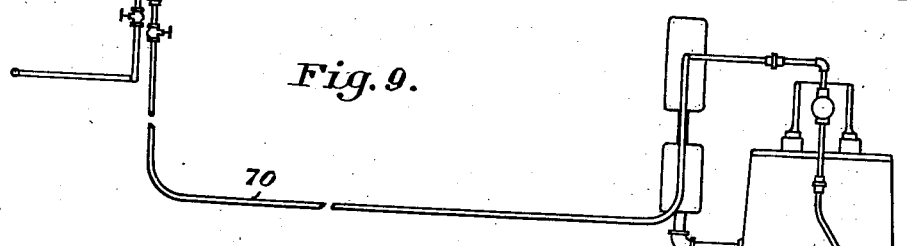
Fig. 9 is an end elevation thereof.

The control system for the parts already described is illustrated in Figs. 8 through 10. An oil pump 67 is driven continuously by a motor 68. The pump draws fluid such as oil from a reservoir or a sump 69 and delivers it to a high-pressure line 70 or returns it through a by-passing valve 71 to the sump. The line 70 extends downwardly into the mandrel 19 as shown in Figs. 2 and 9 and is connected to the line 54 extending from the cylinder in the connecting portion 36 of the mandrel 20 forwardly along the latter and the mandrel 19. The valve 71 is actuated by a pneumatic piston and cylinder 72 controlled by a foot valve 73 through connections 74. A foot valve 75 controls the application of air under pressure to the cylinder 60 through connections 76 extending into the mandrel 19 and longitudinally thereof in the same manner as the connection 70. The valves 73 have connections 77 to a convenient source of air under pressure and exhaust connections 78.

The by-passing valve 71 is normally open so that the pump 67 merely recirculates fluid from and to the reservoir 69. When the leading end of an advancing pipe length has passed beyond the cutting tool 44, the operator actuates the foot valve 73. This admits air under pressure to the cylinder 72 and to a cylinder 79, the purpose of which will be shortly explained. The cylinder 72 thus closes the valve 71 whereupon the pump 67 delivers fluid under high pressure to the cylinder formed in the connecting portion 36 designated 80 in Fig. 8. When the entire length of the pipe has passed over the mandrel 20, the operator restores in the valve 73 which reverses the operations just described. Immediately thereafter he actuates valve 75 which admits air pressure to the rear end of the cylinder 60 causing the pan 58 to be withdrawn and accumulations of burr dumped therefrom. He then restores the valve 75 to return the piston rod 61 and the pan 58.

In addition to the inside burr trimmer and the control system therefor described above, I also provide means for removing the external burr from the welded seam. This means includes a tool holder 81 slidable vertically on a carriage 82. The carriage 82 is mounted on the housings 31 and is also slidable vertically. The carriage is adjusted by means of a screw 83. The tool holder 81 has a slot 84 in which is received a guide pin 85 extending outwardly from the carriage 82. The tool holder 81 is provided with a grooved roller 86 adapted to ride on the pipe straddling the seam. A cutting tool 87 is received in a suitably shaped socket in the holder 81 and is held in place by a set screw 88. The tool is adjusted longitudinally by a screw 89 in a manner similar to that in which the tool 44 is adjusted.

As already intimated, the holder 81 is actuated by a piston reciprocating in the cylinder 79 mounted on the carriage 82. When the valve 73 is actuated to operate the pneumatic motor 72 for closing the by-passing valve 71, air under pressure is admitted to the top of the cylinder 79 forcing the carriage 82 downwardly until the roll 86 engages the pipe. In this position of the carriage, of course, the tool 87 is effective to remove the outside burr. When the valve 73 is restored, pressure is applied to the bottom of the cylinder 79 causing the holder 81 to be raised, retracting the tool 87 from burr removing position.

It will be apparent from the foregoing description that the invention provides a relatively simple yet highly effective means for removing the burr from welded pipe. The inside burr trimmer is compact so it can be designed for relatively small pipe sizes yet is sufficiently sturdy in design to withstand the large forces to which it is subject in operation. The side wall portions 34 of the mandrel with their elevated edges 56 provide a confined space for receiving the burr as removed. The sliding pan 48 permits accumulations of burr to be dumped between successive pipe lengths. The power operated thruster 52 maintains the tool holding carriage in operative relation to the advancing pipe length and the retracting bolt 39 withdraws it immediately when the pressure is relieved from the cylinder 80. The high sides of the burr receiving chamber prevent the burr from being dispersed around the interior of the pipe. The cutting tool 44 is at the extreme forward end of the movable tool holder thus providing sufficient clearance for the burr to curl away from the seam and fall into the receiving chamber. This disposition of the burr is facilitated by use of a headless set screw 46 to hold the tool in position. The advantage resulting from the disposition of the power operating means for the tool holding carriage relative to the spring urged retracting bolt in preventing the tool from cutting to an excessive depth has already been mentioned. The power means provided for operating the sliding pan and the tool holding carriage assure positive movement of these parts at the proper time.

A further advantage of the invention is that in case a pipe length is stalled during welding, the operator can withdraw the burr cutting tool by relieving the pressure from the cylinder 80 thus permitting the longitudinal movement of the pipe to be reversed and preventing the breakage of tools which has been experienced with other types of burr trimmer. A further advantage is that no adjustment is necessary for different thicknesses of pipe wall since the thruster 52 advances the carriage 38 until the rolls 49 and 50 engage the inner surface of the pipe thus properly positioning the cutting tool of the wall.

A modified form of the invention illustrated in Figs. 11 through 14 is designed particularly for welders adapted to join the seam cleft edges of the blank when the latter are disposed downwardly instead of upwardly as shown in Fig. 2. The modified form comprises a burr trimmer mandrel 100 adapted to be secured to a welder mandrel, the rear end of which is indicated at 101, in any convenient manner as by bolts 102. The mandrel 100 is composed of spaced side wall portions 103 having abutting projections 104 and secured together by bolts 105 passing through the latter. At its forward end, the mandrel 100 is provided with a bottom supporting roll 106 journaled on a shaft 107. The side wall portions 103 of the mandrel are slotted as at 108 to receive the ends of the shaft 107 which pass through holes 109 in keeper plates 110 bolted to the side walls 103. The ends of the shaft 107 are positioned vertically by shims 111 and are held in place by keepers 112. The bottom roll 106 is preferably grooved to straddle the burr indicated at 113, as the roll engages the pipe at a point ahead of that at which the burr is removed by means to be described shortly.

The mandrel 104 is also provided adjacent its forward end with a top roll 114 adapted to engage the interior of the pipe at a point diagrammatically opposite the welded seam. The roll 114 is journaled on a shaft 115, the ends of which are squared and fit in slots 116 formed in the side walls 103. Wedges 117 are movable along the bottoms of the slots 116 by means of screws 118 threaded therethrough and having thrust washers 119 under their heads. The ends of the screws opposite the heads, which are reduced as at 120, are provided with nuts 121, one of which is a locknut. It will be understood that movement of the wedges 117 longitudinally of the mandrel causes the ends of the shaft 115 and the roll 114 to move vertically.

A tool holding block 122 is disposed between the side walls 103 which are suitably shaped to receive it, adjacent the rear end of the mandrel. The block itself is shown in Figs. 13 through 15. As there illustrated it is provided with an inclined socket 123 adapted to receive the shank of a tool such as that shown at 124 in Fig. 12. The socket 123 intersects a flaring burr discharging recess 125. The lower forward edge of the block is beveled as at 126 to ride up over the edge of an advancing pipe length should the latter strike it. A projection 127 extends upwardly and rearwardly from the block and slotted wings 128 extend laterally thereof. The sides of the block have vertical grooves 129 therein.

The tool 124 is held in place by a wedge 130. A stud 131 threaded into the block is provided with a nut for drawing the wedge home. Clamping screws 132 threaded through the side walls 103 enter the grooves 129 and hold the block in position on the mandrel. Studs 133 threaded into the side walls pass through the slots in the wings 128 and are provided with adjusting nuts 134 on opposite sides of the wings. The block may thus be adjusted vertically by the nuts 134 after the screws 132 have been loosened. The latter also permit lateral adjustment of the block. A slotted screw 135 extends through a hole 136 in the projection 127 and is provided with nuts 137 on opposite sides of the latter. The screw bears against the end of the shank of the tool 124 whereby adjustment of the nut 137 causes longitudinal movement of the tool in its socket after the wedge 130 has been released.

Figure 11:
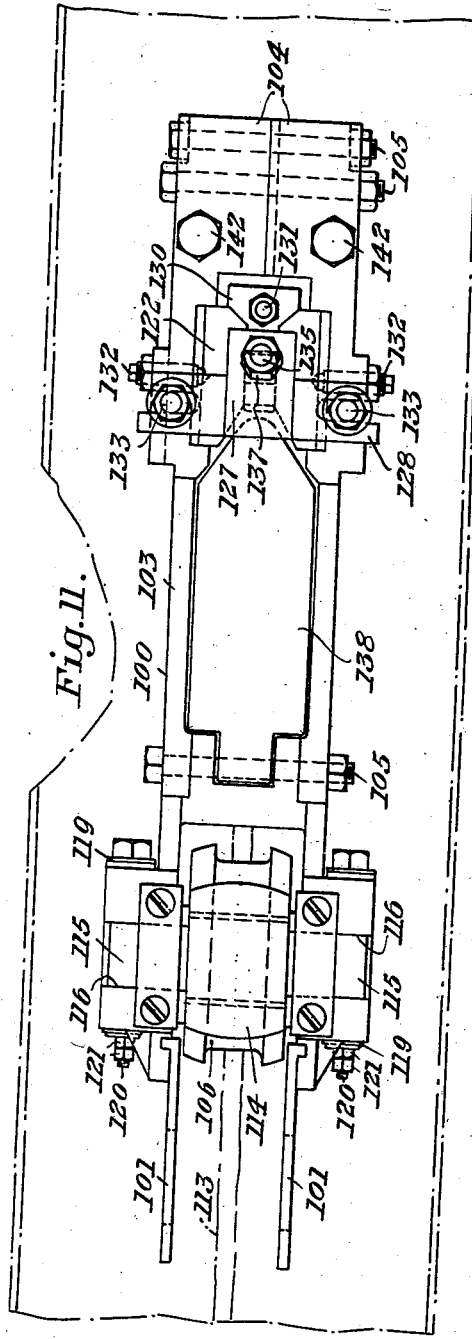
Fig. 11 is a plan view of a modified form of inside burr trimmer.
Figure 12:
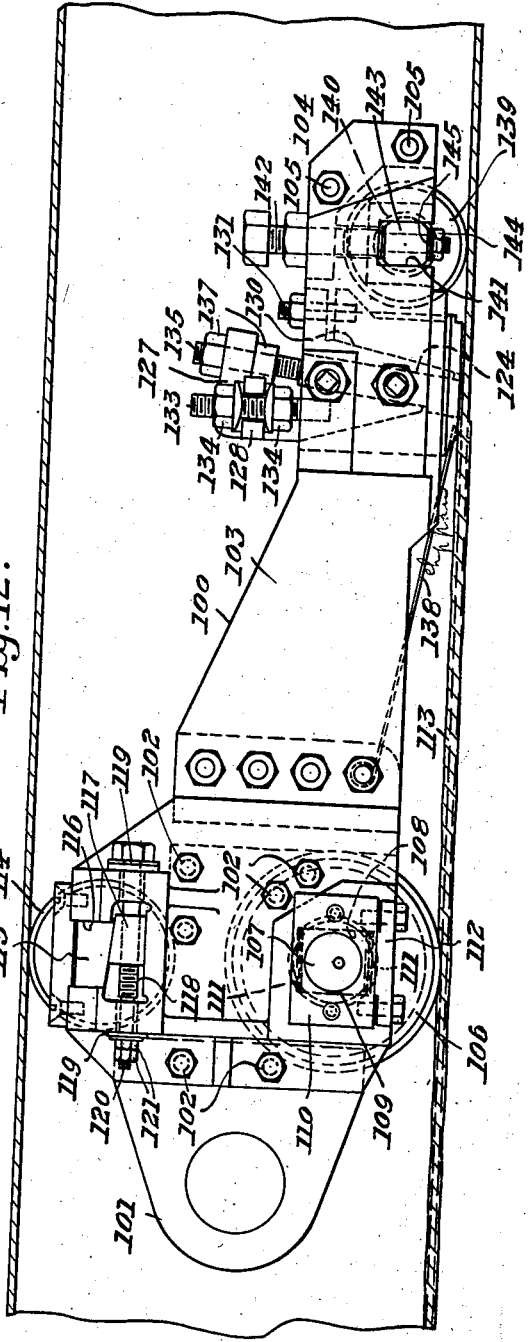
Fig. 12 is a side elevation thereof.

A tilting pan 138 is pivoted on one of the bolts 105 and has its free end tapered to fit into the recess 125 as shown in Fig. 11, thus providing a surface on which the burr removed by the tool 124 is deposited. While a pipe length is traversing the mandrel, the free end of the pan rests on the inside burr. As a pipe length passes off the mandrel the pan swings to a vertical position to dump the burr collected thereon.

The rear end of the mandrel is supported by a roll 139 journaled on a shaft 140 having squared ends received within slots 141 formed in the side walls 103. Screws 142 extending vertically through the side walls and having threaded engagement therewith have their lower ends reduced as at 143. These reduced ends pass through holes in the ends of the shaft 140 which are held thereon by nuts 144. Washers 145 are disposed between the shaft 140 and the nuts 144 and between the shaft and the shoulder intermediate the length of the screws 142. By means of the latter the shaft 140 may be adjusted vertically to so position the roll 139 relative to the mandrel that it will in turn position the mandrel relative to the welded seam of a pipe length traversing the mandrel.

It will be observed from the description of the modified form of the invention that it incorporates certain of the principles characterizing the form of invention first described, notably the compact design, sturdy construction and extreme flexibility of adjustment, as well as a movable burr receiving support adapted to be dumped between the passage of successive lengths of the mandrel. In operation, the roll 139 rests on a cooperating guide roll for the pipe (not shown) but is lifted therefrom by the advancement of the leading end of the pipe, the tool holding block being guided onto the inner wall of the pipe by its beveled front edge 126. The edge of the tool 124 being slightly lower than the edge of the tool block cuts into the bead and removes it. The bead curls up in front of the tool in the large roll, being confined between the side walls 103.

Although I have illustrated and described herein but a preferred form of the invention with a modification, it will be understood that changes in the construction and operation disclosed may be made without departing from the spirit of the invention or the scope of the appended claims.

I claim:

1. Apparatus for removing the burr from a longitudinal weld in a length of pipe comprising a mandrel adapted to be enclosed by a pipe length moving axially, said mandrel having spaced side walls along at least a portion of its length, a burr-removing tool carried on said mandrel, means for supporting the tool adjacent said portion, a burr receiving pan movably mounted between said walls, and a cross wall extending between side walls and defining therewith and with said pan a box adapted to hold accumulations of burr as removed from a pipe length.

2. Apparatus for removing the burr from a longitudinal weld in a length of pipe comprising a mandrel adapted to be enclosed by a pipe length moving axially, said mandrel having spaced side walls along at least a portion of its length, a burr-removing tool carried on said mandrel, means for supporting the tool adjacent said portion, a burr receiver slidably mounted between said walls, means for reciprocating said receiver, and a cross wall extending between said side walls effective to scrape burr accumulations from said receiver on reciprocation of the latter.

3. Apparatus for removing the burr from a longitudinal weld in a length of pipe comprising a mandrel adapted to be enclosed by a pipe length moving axially, said mandrel having spaced side walls along at least a portion of its length, a burr-removing tool carried on said mandrel, means for supporting the tool adjacent said portion, a burr receiver movably mounted between said walls, and power-operated means on said mandrel connected to said receiver and effective to dump accumulations of burr therefrom.

4. Apparatus for removing the burr from a longitudinal weld in a length of pipe comprising a mandrel adapted to be enclosed by a pipe length moving axially, said mandrel having an opening therethrough, means mounting a burr-removing tool adjacent said opening and a movable pan in said opening adapted to support accumulations of burr removed by said tool.

5. Apparatus for removing the burr from a longitudinal weld in a length of pipe comprising a mandrel adapted to be enclosed by a pipe length moving axially, said mandrel having an opening therethrough, means mounting a burr-removing tool adjacent said opening, a movable bottom for said opening adapted to support accumulations of burr removed by said tool, and a fluid-pressure operated cylinder and piston on said mandrel connected to said bottom.

6. Apparatus for removing the burr from the inside of a longitudinal welded seam in a pipe length as the latter moves axially comprising a mandrel adapted to be embraced by a pipe length and including spaced side wall portions, a tool holding block adjustably disposed between said portions, a socket extending upwardly into the block and adapted to receive a tool shank, means associated with said block for holding a tool shank disposed in said socket, and means for adjusting said block toward and from said side wall portions.

7. Apparatus for removing the burr from the inside of a longitudinal welded seam in a pipe length as the latter moves axially comprising a mandrel adapted to be embraced by a pipe length and including spaced side wall portions, a tool holding block adjustably disposed between said portions, a socket extending upwardly into the block and adapted to receive a tool shank, means associated with said block for holding a tool shank disposed in said socket, wings extending laterally from said block and adjusting screws carried on said mandrel and extending through said wings.

8. Apparatus for removing the burr from the inside of a longitudinal welded seam in a pipe length as the latter moves axially comprising a mandrel adapted to be embraced by a pipe length and including spaced side wall portions, a tool holding block adjustably disposed between said portions, a socket extending upwardly into the block and adapted to receive a tool shank, a wedge extending into said socket, and means on the block for forcing the wedge into the socket to clamp a tool shank therein.

9. Apparatus for removing the burr from the inside of a longitudinal welded seam in a pipe length as the latter moves axially comprising a mandrel adapted to be embraced by a pipe length, a burr removing tool on said mandrel, a shaft extending transversely of the mandrel, a mandrel positioning roll journaled on said shaft and adapted to engage the wall of a pipe length, wedges movable on said mandrel supporting said shaft, and means on said mandrel for adjusting said wedges.

10. Apparatus for removing the burr from a longitudinal weld in a length of pipe comprising a mandrel adapted to be enclosed by a pipe length moving axially, said mandrel including spaced side walls, a tool holding carriage slidably disposed between the walls of said mandrel to move laterally of the axis of the mandrel and having a cutting tool thereon and spaced rolls adapted to engage the interior of the pipe and position the tool relative thereto, and power-operated means on said mandrel for moving said carriage laterally of the axis of the mandrel toward the wall of a pipe length enclosing it, and means for controlling said last-mentioned means whereby to actuate the tool toward its working position.

11. Apparatus for removing the burr from a longitudinal weld in a length of pipe comprising a mandrel adapted to be enclosed by a pipe length moving axially, a tool holding carriage movably mounted on said mandrel, a burr removing tool mounted on said carriage adjacent one end thereof, positioning rolls on said carriage, one adjacent said tool and one adjacent the other end of the carriage, and means for applying force to said carriage radially of a pipe length enclosing the mandrel at a point between the last-mentioned roll and the middle of the carriage, whereby said means is effective to move the end of the carriage remote from the tool into engagement with the interior of a pipe first.

12. Apparatus for removing the burr from a longitudinal weld in a length of pipe comprising a mandrel adapted to be enclosed by a pipe length moving axially, said mandrel having spaced side walls along at least a portion of its length, a burr-removing tool carried on said mandrel, means for supporting the tool adjacent said portion, a plate movably mounted between said walls adjacent said tool, said plate and walls defining a chamber adapted to receive burr material from said tool, and means for moving the plate to dump accumulations of burr material.

13. The apparatus defined by claim 12 characterized by said plate being slidable longitudinally of said mandrel.

14. Apparatus for removing the burr from a longitudinal weld in a length of pipe comprising a mandrel adapted to be enclosed by a pipe length moving axially, a tool holding carriage mounted on said mandrel for movement laterally of the axis thereof, rolls on said carriage adapted to engage the wall of a pipe length enclosing the mandrel, power operated means for so moving the carriage laterally of the axis of the mandrel that said rolls engage said wall, and control means for said last-mentioned means whereby the carriage may be actuated in accordance with the travel of the pipe.

LEOPOLD DE FIORE.